(12) United States Patent
Jin

(10) Patent No.: US 12,549,778 B2
(45) Date of Patent: Feb. 10, 2026

(54) ANGLE-OF-VIEW SWITCHING METHOD, APPARATUS AND SYSTEM FOR FREE ANGLE-OF-VIEW VIDEO, AND DEVICE AND MEDIUM

(71) Applicant: BEIJING BYTEDANCE NETWORK TECHNOLOGY CO., LTD., Beijing (CN)

(72) Inventor: Youzhi Jin, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 193 days.

(21) Appl. No.: 18/551,913

(22) PCT Filed: Aug. 16, 2022

(86) PCT No.: PCT/CN2022/112805
§ 371 (c)(1),
(2) Date: Sep. 22, 2023

(87) PCT Pub. No.: WO2023/035879
PCT Pub. Date: Mar. 16, 2023

(65) Prior Publication Data

US 2024/0223819 A1 Jul. 4, 2024

(30) Foreign Application Priority Data

Sep. 9, 2021 (CN) .......................... 202111056276.8

(51) Int. Cl.
*H04N 21/218* (2011.01)
*H04N 21/2187* (2011.01)
*H04N 21/6587* (2011.01)

(52) U.S. Cl.
CPC ... *H04N 21/21805* (2013.01); *H04N 21/2187* (2013.01); *H04N 21/6587* (2013.01)

(58) Field of Classification Search
CPC ......... H04N 21/21805; H04N 21/6587; H04N 21/2187; H04N 21/23106; H04N 21/816; H04N 21/8547
See application file for complete search history.

(56) References Cited

U.S. PATENT DOCUMENTS

2011/0138432 A1* 6/2011 Mitra ............... H04N 21/64322
725/109
2014/0101227 A1 4/2014 Bieselt et al.
(Continued)

FOREIGN PATENT DOCUMENTS

CN 102055967 A 5/2011
CN 102325261 A 1/2012
(Continued)

OTHER PUBLICATIONS

Partial Supplementary European Search Report for European Patent Application No. 22866353.0, mailed on Dec. 9, 2024, 14 pages.
(Continued)

*Primary Examiner* — Ngoc K Vu
(74) *Attorney, Agent, or Firm* — Astute IP Law Group

(57) ABSTRACT

Provided are a view angle switching method, apparatus and system for a free view angle video, a device, and a medium. The method is applied to a client and includes: determining view angle switching information according to a view angle switching operation triggered by a user; transmitting the view angle switching information to a low-latency room corresponding to the client through a low-latency server so that in response to determining that a view angle change message in the low-latency room is monitored, a media server determines a target video stream after a view angle is switched based on the view angle switching information and pushes the target video stream to the low-latency room; and
(Continued)

obtaining and playing the target video stream in the low-latency room through the low-latency server.

20 Claims, 4 Drawing Sheets

(56) References Cited

U.S. PATENT DOCUMENTS

| | | | |
|---|---|---|---|
| 2014/0198178 | A1 | 7/2014 | Ioffe et al. |
| 2015/0089555 | A1 | 3/2015 | Abkairov et al. |
| 2015/0296247 | A1 | 10/2015 | Glasser |
| 2017/0013283 | A1* | 1/2017 | Zhang ................ H04N 21/6547 |
| 2017/0171341 | A1* | 6/2017 | Zane .................... H04N 21/222 |
| 2017/0280054 | A1 | 9/2017 | Li |
| 2017/0359612 | A1 | 12/2017 | Kuplevakhsky |
| 2019/0057721 | A1 | 2/2019 | Ying et al. |
| 2021/0014558 | A1 | 1/2021 | Fan et al. |
| 2021/0176408 | A1 | 6/2021 | Zhang et al. |
| 2022/0210486 | A1* | 6/2022 | Chen ................ H04N 21/21805 |

FOREIGN PATENT DOCUMENTS

| | | |
|---|---|---|
| CN | 110944140 A | 4/2014 |
| CN | 106358036 A | 1/2017 |
| CN | 106612426 A | 5/2017 |
| CN | 111447462 A | 7/2020 |
| CN | 111669518 A | 9/2020 |
| CN | 111866525 A | 10/2020 |
| CN | 112019927 A | 12/2020 |
| CN | 112261421 A | 1/2021 |
| CN | 112333448 A | 2/2021 |
| CN | 112738010 A | 4/2021 |
| CN | 112929580 A | 6/2021 |
| CN | 113794942 A | 12/2021 |
| EP | 3316589 A1 | 5/2018 |
| JP | 2018207153 A | 12/2018 |
| TW | I547177 B * | 8/2016 |
| WO | 2017008620 A1 | 1/2017 |
| WO | 2020012062 A2 | 1/2020 |
| WO | 2020022943 A1 | 1/2020 |

OTHER PUBLICATIONS

Wang S., et al., "SphericRTC: A System for Content-Adaptive Real-Time 360-Degree Video Communication," Proceedings of the 13th ACM SIGPLAN International Symposium on Haskell, ACMPUB27, Oct. 2020, pp. 3595-3603.

Extended European Search Report for European Patent Application No. 22866353.0, mailed on Feb. 10, 2025, 7 pages.

Communication pursuant to Article 94(3) EPC for European Patent Application No. 22866353.0, mailed on Feb. 21, 2025, 7 pages.

International Search Report (with English translation) and Written Opinion issued in PCT/CN2022/112805, dated Oct. 27, 2022, 12 pages provided.

Chinese Office Action, issued in Chinese patent application No. 202111056276.8, dated Jul. 5, 2022, 20 pages (translation enclosed).

Xu Buyang et al., Design and Implementation of Free Viewpoint Interactive Live Video System Based on 5G, 2021, 4 pages, vol. 48(7).

* cited by examiner

ANGLE-OF-VIEW SWITCHING METHOD, APPARATUS AND SYSTEM FOR FREE ANGLE-OF-VIEW VIDEO, AND DEVICE AND MEDIUM

CROSS-REFERENCE TO RELATED APPLICATIONS

This is a National Stage Application, filed under 35 U.S.C. 371, of International Patent Application No. PCT/CN2022/112805, filed on Aug. 16, 2022, which claims priority to Chinese Patent Application No. 202111056276.8 filed with the China National Intellectual Property Administration (CNIPA) on Sep. 9, 2021, the disclosures of which are incorporated herein by reference in their entireties.

TECHNICAL FIELD

Embodiments of the present disclosure relate to Internet technologies, for example, a view angle switching method, apparatus and system for a free view angle video, a device, and a medium.

BACKGROUND

With the rapid development of Internet technologies and an increasing demand of users, a free view angle video has been researched and developed to make a user view a video in different view angles. The user may freely switch a view angle in the process of viewing the free view angle video, but the switching speed is relatively slow when the view angle is switched, the case where the video is frozen and discontinuous often exists, which greatly reduces the user viewing experience.

SUMMARY

Embodiments of the present disclosure provide a view angle switching method, apparatus and system for a free view angle video, a device, and a medium to improve the view angle switching speed, ensure the video switching fluency, improve the user viewing experience, and reduce network bandwidth requirements.

An embodiment of the present disclosure provides a view angle switching method for a free view angle video. The method is applied to a client and includes the steps below.

View angle switching information is determined according to a view angle switching operation triggered by a user.

The view angle switching information is transmitted to a low-latency room corresponding to the client through a low-latency server so that in response to determining that a view angle change message in the low-latency room is monitored, a media server determines a target video stream after a view angle is switched based on the view angle switching information and pushes the target video stream to the low-latency room.

The target video stream in the low-latency room is obtained through the low-latency server, and the target video stream is played.

An embodiment of the present disclosure further provides a view angle switching method for a free view angle video. The method is applied to a media server and includes the steps below.

In response to determining that a view angle change message in a low-latency room corresponding to a client is monitored, a target video stream after a view angle is switched is determined based on view angle switching information in the low-latency room, where the view angle change message is generated when the client transmits the view angle switching information to the low-latency room through a low-latency server, and the view angle switching information is determined according to a view angle switching operation triggered by a user.

The target video stream is pushed to the low-latency room so that the client obtains the target video stream in the low-latency room through the low-latency server and plays the target video stream.

An embodiment of the present disclosure further provides a view angle switching apparatus for a free view angle video. The apparatus is integrated in a client and includes a view angle switching information determination module, a view angle switching information transmission module, and a target video stream play module.

The view angle switching information determination module is configured to determine view angle switching information according to a view angle switching operation triggered by a user.

The view angle switching information transmission module is configured to transmit the view angle switching information to a low-latency room corresponding to the client through a low-latency server so that in response to determining that a view angle change message in the low-latency room is monitored, a media server determines a target video stream after a view angle is switched based on the view angle switching information and pushes the target video stream to the low-latency room.

The target video stream play module is configured to obtain the target video stream in the low-latency room through the low-latency server and play the target video stream.

An embodiment of the present disclosure further provides a view angle switching apparatus for a free view angle video. The apparatus is integrated in a media server and includes a target video stream determination module and a target video stream pushing module.

The target video stream determination module is configured to, in response to determining that a view angle change message in a low-latency room corresponding to a client is monitored, determine a target video stream after a view angle is switched based on view angle switching information in the low-latency room, where the view angle change message is generated when the client transmits the view angle switching information to the low-latency room through a low-latency server, and the view angle switching information is determined according to a view angle switching operation triggered by a user.

The target video stream pushing module is configured to push the target video stream to the low-latency room so that the client obtains the target video stream in the low-latency room through the low-latency server and plays the target video stream.

An embodiment of the present disclosure further provides a view angle switching system for a free view angle video. The system includes a client, a media server, and a low-latency server.

Each client is configured to implement the view angle switching method for a free view angle video provided in the client-side embodiments of the present disclosure.

The media server is configured to implement the view angle switching method for a free view angle video provided in the media server-side embodiments of the present disclosure.

An embodiment of the present disclosure further provides an electronic device. The electronic device includes one or more processors and a memory configured to store one or more programs.

When the one or more programs are executed by the one or more processors, the one or more processors are caused to implement the view angle switching method for a free view angle video in any one of the embodiments of the present disclosure.

An embodiment of the present disclosure further provides a computer readable storage medium storing a computer program, where the computer program is configured to, when executed by a processor, implements the view angle switching method for a free view angle video according to any one of the embodiments of the present disclosure.

BRIEF DESCRIPTION OF DRAWINGS

In the figures, same or similar reference signs in the drawings denote same or similar components. It is to be understood that the drawings are schematic and that originals and elements are not necessarily drawn to scale.

DETAILED DESCRIPTION

It should be understood that multiple steps recited in the method embodiments of the present disclosure may be executed in a different order and/or in parallel. Additionally, the method embodiments may include additional steps and/or omit the steps shown. The scope of the present disclosure is not limited in this respect.

The term "includes" or its variant used herein means "includes, but is not limited to". The term "based on" means "at least partially based on". The term "an embodiment" means "at least one embodiment". The term "another embodiment" means "at least one other embodiment". The term "some embodiments" means "at least some embodiments". Definitions of other terms are given in the description hereinafter.

It is to be noted that references to "first", "second" and the like in the present disclosure are merely intended to distinguish one from another apparatus, module or unit and are not intended to limit the order or interrelationship of the functions executed by the apparatus, module or unit.

It is to be noted that references to modifications of "one" or "a plurality" mentioned in the present disclosure are intended to be illustrative and not limiting, and that those skilled in the art should understand that it should be understood as "one or more" unless clearly expressed in the context.

The names of messages or information exchanged between apparatuses in the embodiments of the present disclosure are only used for illustrative purposes and not intended to limit the scope of the messages or information.

Figure 1:
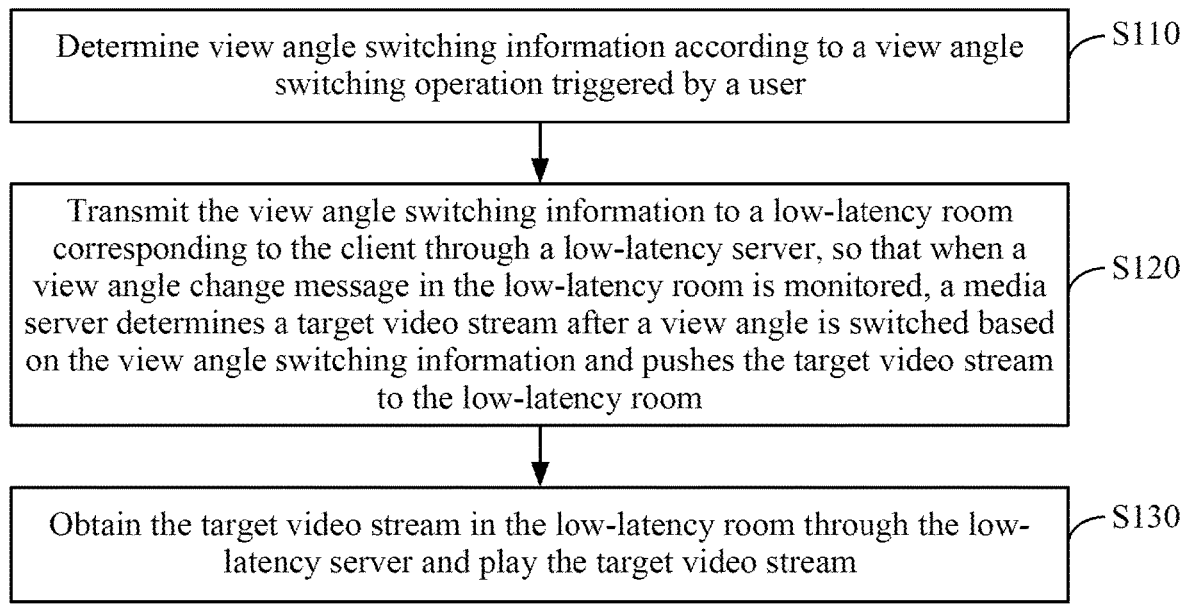
FIG. 1 is a flowchart of a view angle switching method for a free view angle video according to an embodiment of the present disclosure.

FIG. 1 is a flowchart of a view angle switching method for a free view angle video according to an embodiment of the present disclosure. This embodiment is applicable to a case where view angle switching is performed on a free view angle video, for example, an application scenario where the view angle is switched when the free view angle video is a live video, or an application scenario where the view angle is switched when the free view angle video is an on-demand video. The method may be executed by a view angle switching apparatus for a free view angle video. The apparatus may be implemented by software and/or hardware and integrated in a client. As shown in FIG. 1, the method includes the steps below:

In S110, view angle switching information is determined according to a view angle switching operation triggered by a user.

The free view angle video in the embodiments of the present disclosure may be a video captured in real time, i.e., a live video. For example, a live video obtained by capturing the same object in real time by using cameras in different view angles. The free view angle video may also be a video that has been captured, i.e., an on-demand video, for example, an on-demand video obtained after the same object is captured by using cameras in different view angles in advance. The view angle switching operation may refer to an operation in which the user switches the current view angle of a currently played free view angle video. For example, the view angle switching operation may be, but is not limited to, a sliding operation of the user or a clicking operation of the user. The view angle switching information may be used for representing information after the view angle is switched. For example, if the view angle switching method in the embodiments of the present disclosure is applied to a video live scenario, the view angle switching information may include target view angle information after the view angle is switched. If the view angle switching method in the embodiments of the present disclosure is applied to a video on-demand scenario, the view angle switching information may include a current play progress identifier when the user triggers the view angle switching operation, in addition to the target view angle information after the view angle is switched. In this manner, a play position of the target video stream after the switching is determined based on the current play progress identifier, thereby ensuring the video viewing continuity. The current play progress identifier may be, but is not limited to, a current play time stamp or a current play video frame sequence number.

For example, in the video live scenario, the user may trigger the view angle switching operation in the process of viewing a live free view angle video on a client. When detecting the view angle switching operation triggered by the user, the client may determine target view angle information after the view angle is switched according to the view angle switching operation. In the video on-demand scenario, the user may trigger the view angle switching operation in the process of viewing an on-demand free view angle video on the client. When the client detects the view angle switching operation triggered by the user, the client may determine the target view angle information after the view angle is switched and the current play progress identifier when the client triggers the view angle switching operation according to the view angle switching operation.

Exemplarily, in the video live scenario and the video on-demand scenario, the target view angle information after the view angle is switched may be determined in at least one of the following manners:

The first determination manner: the target view angle information after the view angle is switched is determined according to a sliding operation of the user.

For example, the user may perform a sliding operation on the screen of the client to perform the view angle switching. For example, the step in which the client determines the target view angle information after the view angle is switched according to the sliding operation of the user may include the following: If the user slides the screen to the left, next view angle information of the current view angle information in the counterclockwise direction is used as the target view angle information after the view angle is switched; or if the user slides the screen to the right, next view angle information of the current view angle information in the clockwise direction is used as the target view angle information after the view angle is switched. The client in the embodiments of the present disclosure may also determine the target view angle information after the view angle is switched according to the sliding direction and the sliding distance of the user. For example, a view angle shift direction is determined according to the sliding direction of the user, and a view angle shift angle with respect to the current view angle is determined according to the current sliding distance of the user so that multiple view angles can be switched at one time, simplifying the switching operation. Exemplarily, if the user slides the screen to the left, it is determined that the view angle shift direction is the counterclockwise direction; and if the user slides the screen to the right, it is determined that the view angle shift direction is the clockwise direction. According to the current sliding distance of the user and the preset correspondence between sliding distances and shift angles, the view angle shift angle with respect to the current view angle may be determined.

The second determination manner: the target view angle information after the view angle is switched is determined according to a view angle clicking operation of the user.

For example, a view angle button corresponding to each view angle that the user may select to view may be displayed on the screen of the client so that the user may click the corresponding view angle button based on the view angle to which the user wants to switch, and thus the client can quickly obtain the target view angle information after the view angle is switched based on the view angle button on which the user clicks, thereby improving the switching efficiency.

In S120, the view angle switching information is transmitted to a low-latency room corresponding to the client through a low-latency server, so that when a view angle change message in the low-latency room is monitored, a media server determines a target video stream after the view angle is switched based on the view angle switching information and pushes the target video stream to the low-latency room.

The media server may refer to a backend server of the client. The low-latency server may refer to a server having a low-latency communication protocol. The low-latency server may forward video streams between the media server and the client to implement the low-latency video transmission. A low-latency room is created on the low-latency server based on the client for achieving the low-latency communication effect. Each client corresponds to one low-latency room. Each low-latency room includes one independent client and one shared media server. For example, the low-latency server may be, but is not limited to, a real time communication (RTC) server. The low-latency room may be, but is not limited to, an RTC room.

For example, before the client starts playing the free view angle video, the media server creates one corresponding low-latency room for the client on the low-latency server so that the low-latency communication with the client can be performed through the low-latency room. After the client obtains the view angle switching information, the client may transmit the view angle switching information to the low-latency server, and the low-latency server then transmits the view angle switching information to the corresponding low-latency room. The media server may monitor in real time whether a view angle change message exists in each low-latency room. When the view angle change message in the low-latency room corresponding to the client is monitored, the media server may determine the target video stream after the view angle is switched based on the view angle switching information, and push the target video stream to the corresponding low-latency room.

In S130, the target video stream in the low-latency room is obtained through the low-latency server and is played.

For example, after the media server pushes the target video stream after the view angle is switched to the corresponding low-latency room, the client may actively pull the target video stream in the low-latency room through the low-latency server, or may passively receive the target video stream in the low-latency room transmitted through the low-latency server. For example, when the low-latency server is the RTC server, the client may pull the target video stream in the low-latency room through the RTC server. Through the low-latency server, the target video stream after the view angle is switched can be quickly obtained and played by the client, the view angle switching speed is improved, the case where the video is frozen and discontinuous existing when the view angle is switched is avoided, the video switching fluency is ensured, and the user viewing experience is improved. Meanwhile, the client needs to download only one video stream, i.e., a video stream in one view angle and does not need to download video streams in all view angles, thereby greatly reducing the network downlink bandwidth requirements.

In the technical schemes of the embodiments of the present disclosure, the client determines the view angle switching information according to the view angle switching operation triggered by the user and transmits the view angle switching information to the low-latency room corresponding to the client through the low-latency server, so that when the view angle change message in the low-latency room is monitored, the media server determines the target video stream after the view angle is switched based on the view angle switching information and pushes the target video stream to the low-latency room, the client obtains the target video stream in the low-latency room through the low-latency server and plays the target video stream. In this manner, the target video stream after the view angle is switched is forwarded through the low-latency server, so that the client can quickly obtain and play the target video stream, the view angle switching speed is improved, the case where the video is frozen and discontinuous existing when the view angle is switched is avoided, the video switching fluency is ensured, and the user viewing experience is improved. Meanwhile, the client needs to download only one video stream, and the network downlink bandwidth requirements are reduced.

On the basis of the preceding technical schemes, before the step S110, playing the free view angle video in a preset view angle before switching may be implemented by executing steps S101 to S103.

In S101, a video play request is transmitted to the media server so that the media server creates the low-latency room corresponding to the client through the low-latency server based on the video play request and transmits room information of the low-latency room to the client.

For example, the client generates the video play request based on a play operation triggered by the user for the free view angle video and transmits the video play request to the media server. When the media server receives the video play request, the media server may inform the low-latency server of allocating one low-latency room to the client so as to push the video stream in the low-latency room, thereby achieving the low-latency communication effect. The media server may obtain the room information of the allocated low-latency room and transmit the room information to the client.

In S102, the room information of the low-latency room is received, and the low-latency room corresponding to the room information is connected to the client through the low-latency server.

For example, when the client receives the room information transmitted by the media server, the client may be connected to the corresponding low-latency room on the low-latency server based on the room information, thereby making the client receive the video stream pushed to the low-latency room.

In S103, a video stream in the low-latency room is obtained through the low-latency server, and the obtained video stream is played. The obtained video stream is in the preset view angle and pushed by the media server.

The preset view angle may refer to a default view angle when the free view angle video is viewed and may be preset based on a service requirement.

For example, after the low-latency room corresponding to the client is created, the media server may push the video stream in the preset view angle to the low-latency room. The client may actively pull the video stream in the preset view angle in the low-latency room through the low-latency server, or may passively receive the video stream which is in the preset view angle in the low-latency room and transmitted through the low-latency server so that the client can start playing the video stream in the preset view angle. When the user triggers the view angle switching operation, the video stream in the preset view angle can be quickly switched to the target video stream for playing in the preceding view angle switching manner, so that the low latency can be achieved, and the video switching fluency is ensured.

Figure 2:
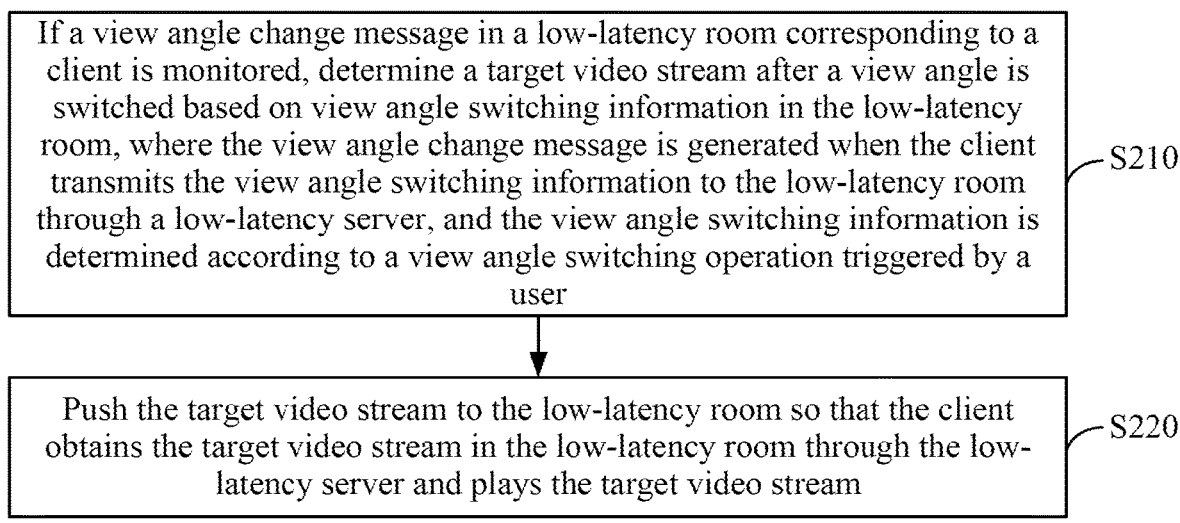
FIG. 2 is a flowchart of a view angle switching method for a free view angle video according to another embodiment of the present disclosure.

FIG. 2 is a flowchart of a view angle switching method for a free view angle video according to another embodiment of the present disclosure. This embodiment is applicable to the case where the view angle switching is performed on the free view angle video, for example, an application scenario where the view angle switching is performed when the free view angle video is a live video, or an application scenario where the view angle switching is performed when the free view angle video is an on-demand video. This method may be executed by a view angle switching apparatus for a free view angle video. The apparatus may be implemented by software and/or hardware and integrated in a media server. As shown in FIG. 2, the method includes the steps below:

In S210, if a view angle change message in a low-latency room corresponding to a client is monitored, a target video stream after a view angle is switched is determined based on view angle switching information in the low-latency room. The view angle change message is generated when the client transmits the view angle switching information to the low-latency room through a low-latency server, and the view angle switching information is determined according to a view angle switching operation triggered by a user.

The media server may refer to a backend server of the client. The low-latency server may refer to a server having the low-latency communication protocol. The low-latency server may forward video streams between the media server and the client to implement the low-latency video transmission. The low-latency room is created on the low-latency server based on the client for achieving the low-latency communication effect. Each client corresponds to one low-latency room. Each low-latency room includes one independent client and one shared media server. For example, the low-latency server may be, but is not limited to, a real-time communication (RTC) server. The low-latency room may be, but is not limited to, an RTC room.

The free view angle video in the embodiments of the present disclosure may be a video captured in real time, i.e., a live video. For example, a live video obtained by capturing the same object in real time by using cameras in different view angles. The free view angle video may also be a video that has been captured, i.e., an on-demand video, for example, an on-demand video obtained after the same object is captured by using cameras in different view angles in advance. The view angle switching operation may refer to an operation in which the user switches the current view angle of a currently played free view angle video. For example, the view angle switching operation may be, but is not limited to, a sliding operation of the user or a clicking operation of the user. The view angle switching information may be used for representing information after the view angle is switched. For example, if the view angle switching method in the embodiments of the present disclosure is applied to a video live scenario, the view angle switching information may include target view angle information after the view angle is switched, and if the view angle switching method in the embodiments of the present disclosure is applied to a video on-demand scenario, the view angle switching information may include a current play progress identifier when the user triggers the view angle switching operation, in addition to the target view angle information after the view angle is switched, so that a play position of the target video stream after the switching is determined based on the current play progress identifier, thereby ensuring the video viewing continuity. The current play progress identifier may be, but is not limited to, a current play time stamp or a current play video frame sequence number.

For the video live scenario, the client may determine the target view angle information after the view angle is switched according to the view angle switching operation triggered by the user and transmit the target view angle information after the view angle is switched to the low-latency room corresponding to the client through the low-latency server. The view angle information in the low-latency room is the view angle information before switching so that the view angle information in the low-latency room may be changed, and the view angle change message may be generated. When the media server monitors the view angle change message in the low-latency room, the media server may determine the target video stream after the view angle is switched based on the target view angle information in the low-latency room.

Exemplarily, in the video live scenario, the step S210 may include determining the target video stream after the view angle is switched according to a current live video stream corresponding to each view angle information after alignment and the target view angle information after the view angle is switched in the low-latency room.

Figure 3:
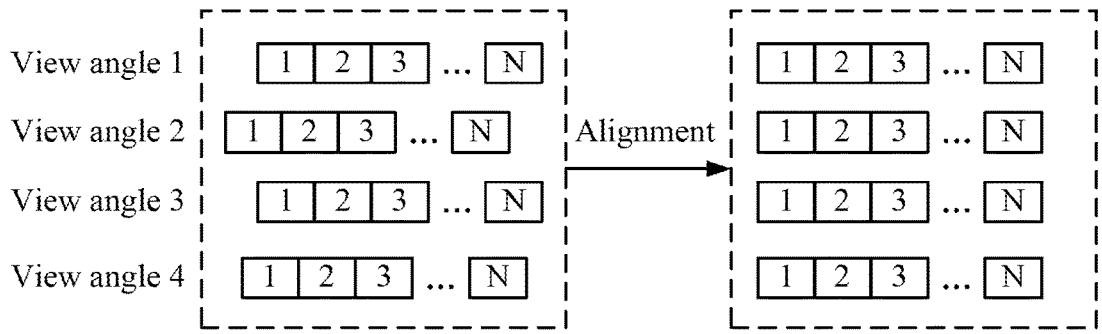
FIG. 3 illustrates an example of alignment of video streams according to an embodiment of the present disclosure.

For example, the media server may receive the current live video stream acquired by the camera in each view angle in real time, and each video frame in each received current live video stream has alignment information so that an alignment operation may be performed on multiple current live video streams based on the alignment information to ensure synchronous play of video streams in different view angles. The alignment information may be, but is not limited to, an acquisition time stamp or a frame sequence number of a video frame. FIG. 3 shows an example of alignment of video streams. As shown in FIG. 3, video frames having the same frame sequence number or the same acquisition time stamp in the current live video stream of each view angle may be used as video frames of the same play moment, thereby obtaining the current live video stream corresponding to each view angle information after alignment. A target current live video stream corresponding to the target view angle information after the view angle is switched, i.e., the target video stream after the view angle is switched, may be determined from the current live video stream corresponding to each view angle information after the alignment.

For a video on-demand scenario, the client may determine the target view angle information after the view angle is switched and the current play progress identifier when the user triggers the view angle switching operation according to the view angle switching operation triggered by the user, and transmit the target view angle information after the view angle is switched and the current play progress identifier to the low-latency room corresponding to the client through the low-latency server, so that the view angle information in the low-latency room changes and the view angle change message is generated. When the media server monitors the view angle change message in the low-latency room, the media server may determine the target video stream after the view angle is switched based on the current play progress identifier and the target view angle information in the low-latency room.

Exemplarily, in the video on-demand scenario, the step S210 may include determining a target on-demand video stream in a target view angle according to an on-demand video stream corresponding to each view angle information after alignment and target view angle information after the view angle is switched in the low-latency room; and determining the target video stream after the view angle is switched based on the target on-demand video stream and the current play progress identifier when the user triggers the view angle switching operation in the low-latency room.

For example, the media server may perform an alignment operation on the on-demand video streams acquired by the camera in each view angle in advance. For example, video frames having the same frame sequence number or video frames having the same acquisition time stamp in the on-demand video stream of each view angle are used as the video frames of the same play moment so that the on-demand video stream corresponding to each view angle information after alignment is obtained. The target on-demand video stream corresponding to the target view angle information after the view angle is switched may be determined from the on-demand video stream corresponding to each view angle information after the alignment. The media server may determine a target video frame in the target on-demand video stream based on the current play progress identifier when the user triggers the view angle switching operation, intercept the target on-demand video stream based on the target video frame, and use a video stream after the target video frame in the target on-demand video stream as the target video stream after the view angle is switched.

In S220, the target video stream is pushed to the low-latency room so that the client obtains the target video stream in the low-latency room through the low-latency server and plays the target video stream.

For example, the media server pushes the target video stream after the view angle is switched to the low-latency room corresponding to the client so that the client may actively pull the target video stream in the low-latency room through the low-latency server, or may passively receive the target video stream in the low-latency room transmitted through the low-latency server. By using the low-latency server, the client can quickly obtain and play the target video stream after the view angle is switched, which improves the view angle switching speed, avoids the case where the video is frozen and discontinuous occurring when the view angle is switched, ensures the video switching fluency, and improves the user viewing experience. Meanwhile, the client needs to download only one video stream, that is, a video stream in one view angle, and does not need to download video streams in all view angles, thereby greatly reducing the network downlink bandwidth requirements.

In the technical schemes of the embodiments of the present disclosure, the client determines the view angle switching information according to the view angle switching operation triggered by the user and transmits the view angle switching information to the low-latency room corresponding to the client through the low-latency server, so that when the view angle change message in the low-latency room is monitored, the media server determines the target video stream after the view angle is switched based on the view angle switching information in the low-latency room and pushes the target video stream to the low-latency room, the client obtains the target video stream in the low-latency room through the low-latency server and plays the target video stream so that the target video stream after the view angle is switched is forwarded through the low-latency server, the client can quickly obtain and play the target video stream, improving the view angle switching speed, avoiding the case where the video is frozen and discontinuous existing when the view angle is switched, ensuring the video switching fluency, and improving the user viewing experience. Meanwhile, the client needs to download only one video stream, reducing the network downlink bandwidth requirements.

On the basis of the preceding technical schemes, before the step S210, the play of the free view angle video in a preset view angle before switching may be implemented by executing steps S201 to S203.

In S201, a video play request transmitted by the client is received.

For example, the client generates the video play request based on a play operation triggered by the user for the free view angle video and transmits the video play request to the media server so that the media server may receive the video play request.

In S202, the low-latency room corresponding to the client is created through the low-latency server based on the video play request, and the view angle change message in the low-latency room is monitored.

For example, after receiving the video play request, the media server may inform the low-latency server of allocating and creating one low-latency room for the client, and the media server monitors the view angle change message in the created low-latency room in real time so that video streams in different view angles can be pushed in time to ensure the view angle switching speed.

In S203, room information in the low-latency room is transmitted to the client so that the client is connected to the low-latency room corresponding to the room information through the low-latency server.

For example, the media server may transmit the room information of the allocated low-latency room to the client. The client may be connected to the corresponding low-latency room on the low-latency server based on the room information so that the client may receive the video stream pushed to the low-latency room.

In S204, the video stream in the preset view angle is pushed to the low-latency room so that the client obtains the video stream in the low-latency room through the low-latency server and plays the obtained video stream.

The preset view angle may refer to a default view angle when the free view angle video is viewed and may be preset based on a service requirement.

For example, the media server may push the video stream in the preset view angle to the low-latency room to implement the low-latency communication effect. The client may actively pull the video stream in the preset view angle in the low-latency room through the low-latency server, or may passively receive the video stream which is in the preset view angle in the low-latency room and is transmitted through the low-latency server. As a result, the client may start playing the video stream in the preset view angle. When the user triggers the view angle switching operation, the video stream in the preset view angle can be quickly switched to the target video stream for playing through the preceding view angle switching method, which has a low latency and ensures the video switching fluency.

Figure 4:
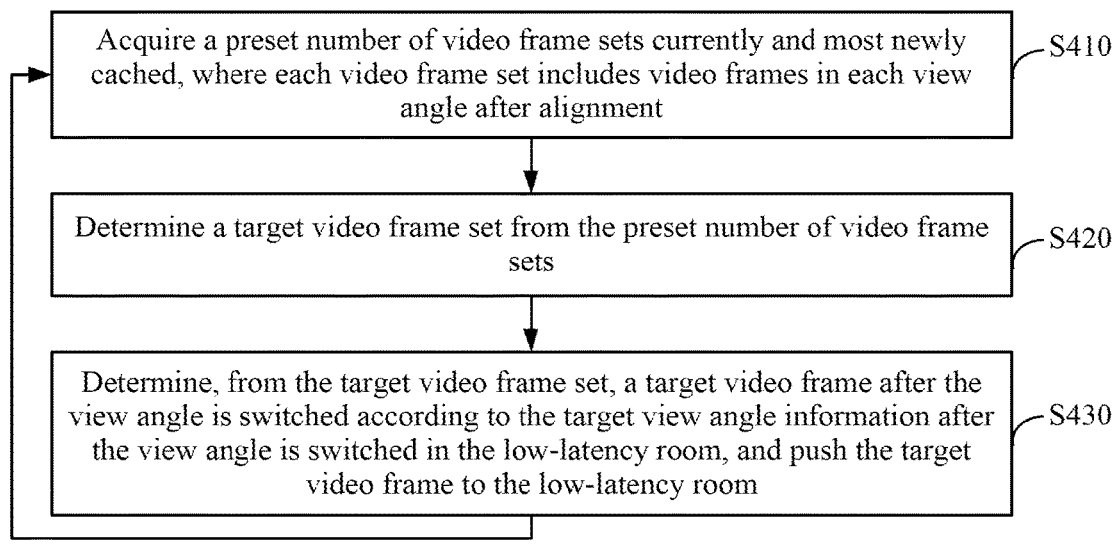
FIG. 4 is a flowchart of a view angle switching method for a free view angle video according to another embodiment of the present disclosure.

FIG. 4 is a flowchart of a view angle switching method for a free view angle video according to an embodiment of the present disclosure. This embodiment describes a push manner of a target video stream in a live video scenario in detail on the basis of the preceding embodiments on the media server side. Terms same as or corresponding to those in the preceding embodiments are not explained again herein.

Referring to FIG. 4, the view angle switching method for the free view angle video according to this embodiment includes the steps below.

In S410, a preset number of video frame sets currently and most newly cached are acquired. Each video frame set includes video frames in each view angle after alignment.

Figure 5:
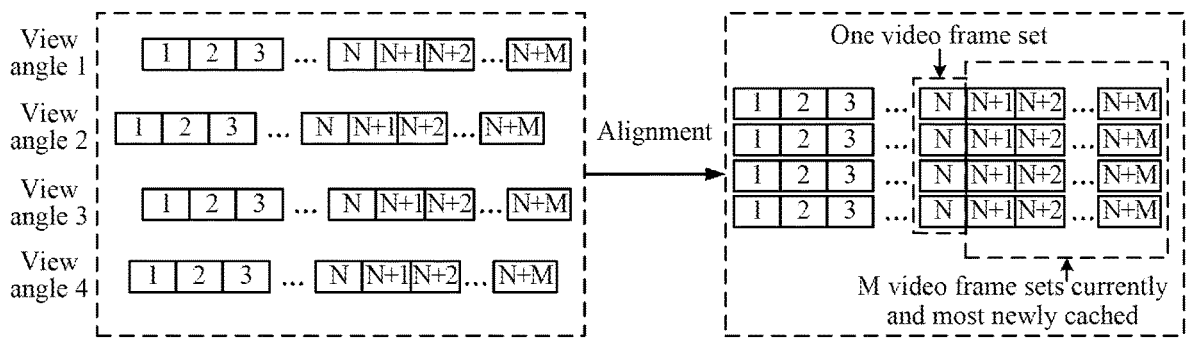
FIG. 5 illustrates an example of a video frame set according to an embodiment of the present disclosure.

For example, in a video live scenario, more and more video frame sets may be obtained over time, and each video frame set is cached. Each cached video frame set includes live video frames in each view angle after alignment. For example, FIG. 5 shows an example of a video frame set. As shown in FIG. 5, each obtained video frame set is cached so that M video frame sets currently and most newly cached may be obtained. It is to be noted that the M video frame sets currently and most newly cached are updated in real time.

Exemplarily, as shown in FIG. 5, before the step S410, the method may further include the following: acquiring a current live video stream currently acquired by a camera in each view angle and alignment information corresponding to each video frame in the current live video stream, combining video frames having the same alignment information in the current live video stream of each view angle into one video frame set, and caching the combined video frame set.

Exemplarily, combining the video frames having the same alignment information in the current live video stream of each view angle into one video frame set may include that video frames having the same acquisition time stamp in the current live video stream of each view angle are combined into one video frame set, or that video frames having the same frame sequence number in the current live video stream of each view angle are combined into one video frame set.

In S420, a target video frame set is determined from the preset number of video frame sets.

For example, the media server may sequentially determine the target video frame set from the preset number of video frame sets currently and most newly cached according to a caching order of each video frame set that has not been pushed. For example, if the caching frequency of video frames is consistent with the pushing frequency of video frames, that is, no video frame set in the preset number of video frame sets currently and most newly cached is pushed, the step S420 may include determining a video frame set having the earliest acquisition time or a video frame set having the smallest frame sequence number among the preset number of video frame sets as the target video frame set. If the caching frequency of video frames is inconsistent with the pushing frequency of video frames since the camera-acquired video streams are not obtained in time due to the network problem, that is, part of the preset number of video frame sets currently and most newly cached are not pushed, a video frame set next to the previously pushed video frame set in the preset number of video frame sets currently and most newly cached may be used as the target video frame set, so that a video frame set which is cached the earliest and has not been may be pushed to the client. In the embodiments of the present disclosure, the target video frame set is determined from the preset number of cached video frame sets, the case where pushing of the video stream is interrupted due to the delayed acquisition of camera-acquired video streams can be avoided, thereby reducing the latency, and ensuring the video viewing fluency.

In S430, the target video frame after the view angle is switched is determined from the target video frame set according to the target view angle information after the view angle is switched in the low-latency room, the target video frame is pushed to the low-latency room, and the process returns to executing the operation of S410.

For example, the media server may use a video frame corresponding to the target view angle information in the target video frame set as the target video frame after the view angle is switched based on the target view angle information in the low-latency room, and transmits the target video frame to the low-latency room, so that the client may obtain the target video frame in the low-latency room through the low-latency server. After transmitting the target video frame, the media server may return to executing the operation of S410 to determine a target video frame of the next push and push the target video frame to the low-latency room, and so on. As a result, the client may obtain the target video stream after the view angle is switched and play the target video stream.

Exemplarily, after the target video frame is pushed to the low-latency room, the method may further include, when multiple clients exist, deleting the target video frame set in the cache after a video frame pushing traversal performed on the low-latency room corresponding to each client ends.

For example, after determining the target video frame set to be pushed, the media server may traverse the low-latency room corresponding to each client, determine the corresponding video frame from the target video frame set based on the view angle information in each low-latency room, and transmit the corresponding video frame to the low-latency room. After traversing all low-latency rooms, the media server may delete the target video frame set from the cache so that the pushed video frame set can be deleted in time, the memory space is released, and the operation performance is improved. After deleting the target video frame set in the cache, the media server may return to executing the operation of S410 to push the next video frame, thereby completing the stream pushing operation of video frames.

In the technical schemes of the embodiments of the present disclosure, by acquiring the preset number of video frame sets currently and most newly cached, the media server determines the target video frame set from the preset number of video frame sets, determines the target video frame after the view angle is switched from the target video frame set according to the target view angle information after the view angle is switched in the low-latency room, and pushes the target video frame to the low-latency room. In this manner, the video frame pushing traversal may be performed on the low-latency room corresponding to each client based on the target video frame set, the media server need to fetch the target video frame set from the cache only once to satisfy the pushing requirements of all clients, reducing cache read and write times, and improving the operation performance.

The following are embodiments of a view angle switching apparatus for a free view angle video provided in the embodiments of the present disclosure. The view angle switching apparatus and the view angle switching method for a free view angle video in the preceding client-side embodiments belong to the same concept. For details not described in detail in the embodiments of the view angle switching apparatus for a free view angle video, reference is made to the view angle switching method for a free view angle video provided in the preceding client-side embodiments.

Figure 6:
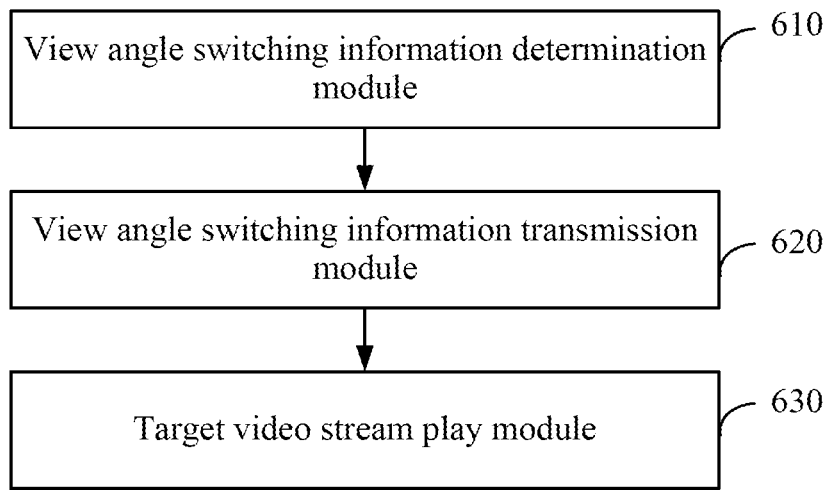
FIG. 6 is a structural diagram of a view angle switching apparatus for a free view angle video according to an embodiment of the present disclosure.

FIG. 6 is a structural diagram of a view angle switching apparatus for a free view angle video according to an embodiment of the present disclosure. This embodiment is applicable to the case where the view angle switching is performed on the free view angle video, and the apparatus is integrated in a client. As shown in FIG. 6, the apparatus includes a view angle switching information determination module 610, a view angle switching information transmission module 620, and a target video stream play module 630.

The view angle switching information determination module 610 is configured to determine view angle switching information according to a view angle switching operation triggered by a user. The view angle switching information transmission module 620 is configured to transmit the view angle switching information to a low-latency room corresponding to the client through a low-latency server so that when a view angle change message in the low-latency room is monitored, a media server determines a target video stream after a view angle is switched based on the view angle switching information and pushes the target video stream to the low-latency room. The target video stream play module 630 is configured to obtain the target video stream in the low-latency room through the low-latency server and play the target video stream.

In the technical schemes of the embodiments of the present disclosure, the client determines the view angle switching information according to the view angle switching operation triggered by the user and transmits the view angle switching information to the low-latency room corresponding to the client through the low-latency server so that when the view angle change message in the low-latency room is monitored, the media server determines the target video stream after the view angle is switched based on the view angle switching information in the low-latency room and pushes the target video stream to the low-latency room, and the client obtains the target video stream in the low-latency room through the low-latency server and plays the target video stream. In this manner, the target video stream after the view angle is switched is forwarded through the low-latency server, the client can quickly obtain and play the target video stream, the view angle switching speed is improved, the case where the video is frozen and discontinuous existing when the view angle is switched can be avoided, the video switching fluency is ensured, and the user viewing experience is improved. Meanwhile, the client needs to download only one video stream, and the network downlink bandwidth requirements are reduced.

On the basis of the preceding technical scheme, in a video live scenario, the view angle switching information includes target view angle information after the view angle is switched. In a video on-demand scenario, the view angle switching information includes the target view angle information after the view angle is switched and a current play progress identifier when the user triggers the view angle switching operation.

On the basis of the preceding multiple technical schemes, the current play progress identifier is a current play time stamp or a current play video frame sequence number.

On the basis of the preceding multiple technical schemes, the view angle switching information determination module 610 is configured to determine the target view angle information after the view angle is switched according to a sliding operation of the user or a view angle clicking operation of the user.

On the basis of the preceding multiple technical schemes, the view angle switching information determination module 610 is further configured to, if the user slides a screen to the left, use next view angle information of current view angle information in a counterclockwise direction as the target view angle information after the view angle is switched; and the view angle switching information determination module 610 is further configured to, if the user slides the screen to the right, use next view angle information of current view angle information in a clockwise direction as the target view angle information after the view angle is switched.

On the basis of the preceding multiple technical schemes, the apparatus further includes a video play request transmission module, a room information reception module, and a preset view angle video stream play module.

The video play request transmission module is configured to, before the view angle switching information is determined according to the view angle switching operation triggered by the user, transmit a video play request to the media server so that the media server creates the low-latency room corresponding to the client through the low-latency server based on the video play request and transmits room information of the low-latency room to the client.

The room information reception module is configured to receive the room information of the low-latency room and connect to the low-latency room corresponding to the room information through the low-latency server.

The preset view angle video stream play module is configured to obtain a video stream in the low-latency room through the low-latency server, and play the obtained video stream, where the obtained video stream is in a preset view angle and pushed by the media server.

On the basis of the preceding multiple technical schemes, the low-latency server is a real-time communication (RTC) server, and the low-latency room is an RTC room.

The view angle switching apparatus for a free view angle video provided in the embodiments of the present disclosure may execute the view angle switching method for a free view angle video provided in the client-side embodiments of the present disclosure, and has corresponding functional modules and beneficial effects for executing the view angle switching method for a free view angle video.

It is to be noted that multiple units and modules included in the preceding apparatus are divided according to function logic. These units and modules may also be divided in other manners as long as the corresponding functions can be implemented. Moreover, names of these function units are used for distinguishing between these function units and not intended to limit the scope of the embodiments of the present disclosure.

The following is an embodiment of the view angle switching apparatus for a free view angle video provided in the embodiments of the present disclosure. This apparatus belongs to the same concept as the view angle switching method for a free view angle video in the preceding media server-side embodiments. For details not described in detail in the embodiments of the view angle switching apparatus for a free view angle video, reference is made to the view angle switching method for a free view angle video provided by the preceding media server-side embodiments.

Figure 7:
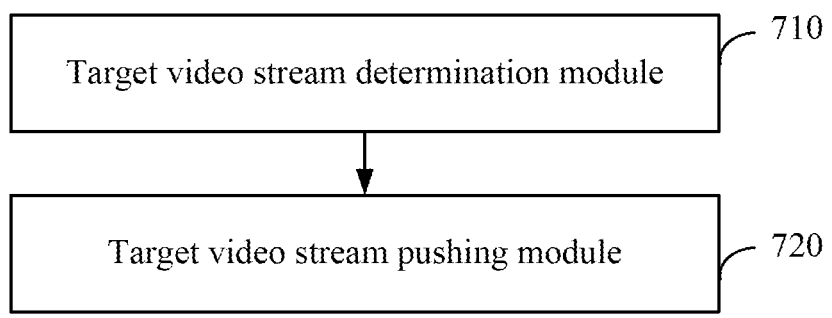
FIG. 7 is a structural diagram of a view angle switching apparatus for a free view angle video according to another embodiment of the present disclosure.

FIG. 7 is a structural diagram of a view angle switching apparatus for a free view angle video according to another embodiment of the present disclosure. This embodiment is applicable to the case where the view angle switching is performed on the free view angle video, and the apparatus is integrated in a media server. As shown in FIG. 7, the apparatus includes a target video stream determination module 710 and a target video stream pushing module 720.

The target video stream determination module 710 is configured to, if a view angle change message in a low-latency room corresponding to a client is monitored, determine a target video stream after a view angle is switched based on view angle switching information in the low-latency room. The view angle change message is generated when the client transmits the view angle switching information to the low-latency room through a low-latency server, and the view angle switching information is determined according to a view angle switching operation triggered by a user. The target video stream pushing module 720 is configured to push the target video stream to the low-latency room so that the client obtains the target video stream in the low-latency room through the low-latency server and plays the target video stream.

In the technical schemes of the embodiments of the present disclosure, the client determines the view angle switching information according to the view angle switching operation triggered by the user and transmits the view angle switching information to the low-latency room corresponding to the client through the low-latency server, so that when the view angle change message in the low-latency room is monitored, the media server determines the target video stream after the view angle is switched based on the view angle switching information in the low-latency room and pushes the target video stream to the low-latency room, and the client obtains the target video stream in the low-latency room through the low-latency server and plays the target video stream. In this manner, the target video stream after the view angle is switched is forwarded through the low-latency server, the client can quickly obtain and play the target video stream, the view angle switching speed is improved, the case where the video is frozen and discontinuous existing when the view angle is switched can be avoided, the video switching fluency is ensured, and the user viewing experience is improved. Meanwhile, the client needs to download only one video stream, and the network downlink bandwidth requirements are reduced.

On the basis of the preceding technical schemes, the target video stream determination module 710 and the target video stream pushing module 720 include a video frame set acquisition unit, a target video frame set determination unit, and a target video frame pushing unit.

The video frame set acquisition unit is configured to acquire a preset number of video frame sets currently and most newly cached. Each video frame set includes video frames in each view angle after alignment.

The target video frame set determination unit is configured to determine a target video frame set from the preset number of video frame sets.

The target video frame pushing unit is configured to determine, from the target video frame set, a target video frame after the view angle is switched according to the target view angle information after the view angle is switched in the low-latency room, push the target video frame to the low-latency room, and return to executing the operation of acquiring the preset number of video frame sets currently and most newly cached.

On the basis of the preceding multiple technical schemes, the apparatus further includes a current live video stream acquisition unit and a video frame combination unit.

The current live video stream acquisition unit is configured to, before the preset number of video frame sets currently and most newly cached are acquired, acquire a current live video stream currently acquired by a camera in each view angle and alignment information corresponding to each video frame in the current live video stream.

The video frame combination unit is configured to combine video frames having the same alignment information in the current live video stream of each view angle into one video frame set, and cache the combined video frame set.

On the basis of the preceding multiple technical schemes, the video frame combination unit is configured to combine video frames having the same acquisition time stamp in the current live video stream of each view angle into one video frame set, or combine video frames having the same frame sequence number in the current live video stream of each view angle into one video frame set.

On the basis of the preceding multiple technical schemes, the target video frame set determination unit is configured to determine, among the preset number of video frame sets, a video frame set having the earliest acquisition time or a video frame set having the smallest frame sequence number as the target video frame set.

On the basis of the preceding multiple technical schemes, the apparatus further includes a target video frame deletion unit.

The target video frame deletion unit is configured to, after the target video frame is pushed to the low-latency room, if multiple clients exist, delete the target video frame set in a cache after a video frame pushing traversal performed on the low-latency room corresponding to each client ends.

On the basis of the preceding multiple technical schemes, the target video stream determination module 710 is further configured to determine the target video stream after the view angle is switched according to a current live video stream corresponding to each view angle information after alignment and target view angle information after the view angle is switched in the low-latency room.

On the basis of the preceding multiple technical schemes, the target video stream determination module 710 is further configured to determine a target on-demand video stream in a target view angle according to an on-demand video stream corresponding to each view angle information after alignment and target view angle information after the view angle is switched in the low-latency room; and determine the target video stream after the view angle is switched based on the target on-demand video stream and a current play progress identifier when the user triggers the view angle switching operation in the low-latency room.

On the basis of the preceding multiple technical schemes, the apparatus further includes a video play request reception module, a low-latency room creation module, a room information transmission module, and a preset view angle video stream pushing module.

The video play request reception module is configured to, before the view angle change message in the low-latency room corresponding to the client is monitored, receive a video play request transmitted by the client.

The low-latency room creation module is configured to create the low-latency room corresponding to the client through the low-latency server based on the video play request, and monitor the view angle change message in the low-latency room.

The room information transmission module is configured to transmit room information of the low-latency room to the client so that the client is connected to the low-latency room corresponding to the room information through the low-latency server.

The preset view angle video stream pushing module is configured to push a video stream in a preset view angle to the low-latency room so that the client obtains the video stream in the low-latency room through the low-latency server and plays the obtained video stream.

The view angle switching apparatus for a free view angle video provided in the embodiments of the present disclosure may execute the view angle switching method for a free view angle video provided in the media server-side embodiments of the present disclosure, and has corresponding functional modules and beneficial effects for executing the view angle switching method for a free view angle video.

It is to be noted that multiple units and modules included in the preceding apparatus are divided according to function logic. These units and modules may also be divided in other manners as long as the corresponding functions can be implemented. Moreover, names of these function units are used for distinguishing between these function units and not intended to limit the scope of the embodiments of the present disclosure.

Figure 8:
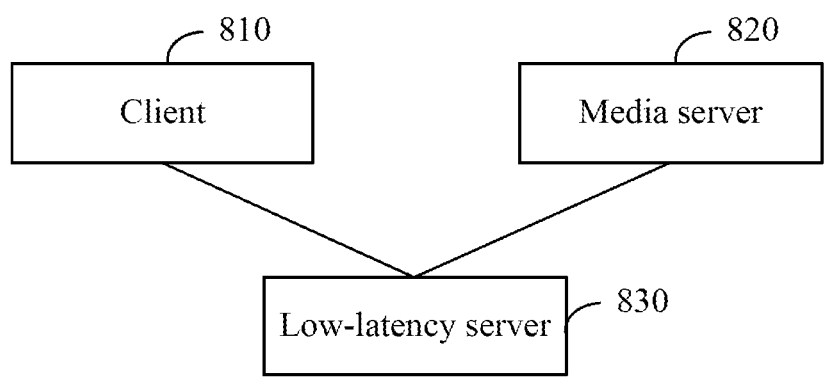
FIG. 8 is a structural diagram of a view angle switching system for a free view angle video according to an embodiment of the present disclosure.

FIG. 8 is a structural diagram of a view angle switching system for a free view angle video according to an embodiment of the present disclosure. This embodiment is applicable to the case where the view angle switching is performed on the free view angle video. As shown in FIG. 8, the system includes a client 810, a media server 820, and a low-latency server 830.

Each client 810 may be configured to implement the view angle switching method for a free view angle video provided in the client-side embodiments of the present disclosure. The media server 820 may be configured to implement the view angle switching method for a free view angle video provided in the media server-side embodiments of the present disclosure. The low-latency server 830 is configured to forward a video stream between the client 810 and the media server 820 to implement the technical effect of low latency.

In the view angle switching system for a free view angle video provided in the embodiment of the present disclosure, the client determines the view angle switching information according to the view angle switching operation triggered by the user and transmits the view angle switching information to the low-latency room corresponding to the client through the low-latency server. When the view angle change message in the low-latency room is monitored, the media server determines the target video stream after the view angle is switched based on the view angle switching information and pushes the target video stream to the low-latency room. The client obtains the target video stream in the low-latency room through the low-latency server and plays the target video stream, thus the target video stream after the view angle is switched is forwarded through the low-latency server, the client can quickly obtain and play the target video stream, the view angle switching speed is improved, the case where the video is frozen and discontinuous existing when the view angle is switched can be avoided, the video switching fluency is ensured, and the user viewing experience is improved. Meanwhile, the client needs to download only one video stream, and the network downlink bandwidth requirements are reduced.

Figure 9:
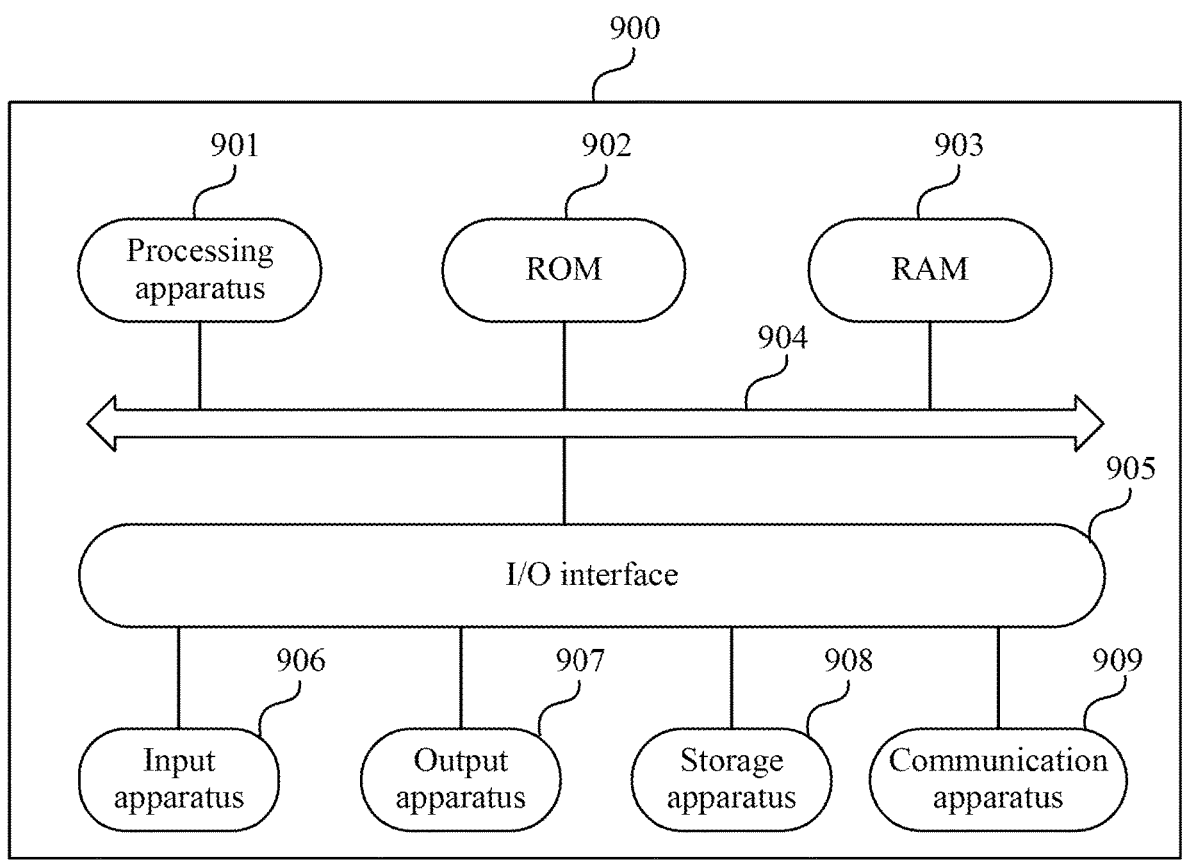
FIG. 9 is a structural diagram of an electronic device according to an embodiment of the present disclosure.

Referring now to FIG. 9, FIG. 9 shows a structure diagram of an electronic device (e.g. a terminal device or a server in FIG. 9) 900 suitable for implementing the embodiments of the present disclosure. The terminal device in the embodiments of the present disclosure may include, but is not limited to, a mobile terminal or a fixed terminal. The mobile terminal may be, for example, a mobile phone, a laptop, a digital radio receiver, a personal digital assistant (PDA), a tablet computer, a portable media player (PMP), or a vehicle-mounted terminal (such as a vehicle-mounted navigation terminal). The fixed terminal may be, for example, a digital television (DTV) or a desktop computer. The electronic device shown in FIG. 9 is merely an example and should not impose any limitation on the function and scope of use of the embodiments of the present disclosure.

As shown in FIG. 9, the electronic device 900 may include a processing apparatus (such as a central processing unit or a graphics processing unit) 901. The processing apparatus 901 may execute various appropriate actions and processing according to a program stored in a read-only memory (ROM) 902 or a program loaded from a storage apparatus 908 into a random-access memory (RAM) 903. The RAM 903 also stores various programs and data required for the operation of the computer device 900. The processing apparatus 901, the ROM 902, and the RAM 903 are connected to each other through a bus 904. An input/output (I/O) interface 905 is also connected to the bus 904.

Generally, the following apparatuses may be connected to the I/O interface 905: an input apparatus 906 such as a touch screen, a touchpad, a keyboard, a mouse, a camera, a microphone, an accelerometer and a gyroscope; an output apparatus 907 such as a liquid crystal display (LCD), a speaker and a vibrator; the storage apparatus 908 such as a magnetic tape and a hard disk; and a communication apparatus 909. The communication apparatus 909 may allow the electronic device 900 to perform wireless or wired communication with other devices to exchange data. Although FIG. 9 illustrates the electronic device 900 having multiple apparatuses, it is to be understood that not all of the illustrated apparatuses are implemented or available. Alternatively, more or fewer apparatuses may be implemented.

According to the embodiments of the present disclosure, the processes described above with reference to the flowcharts may be implemented as computer software programs. For example, an embodiment of the present disclosure includes a computer program product. The computer program product includes a computer program carried on a non-transitory computer-readable medium. The computer program includes program codes configured to execute the methods illustrated in the flowcharts. In such an embodiment, the computer program may be downloaded and installed from a network through the communication apparatus 909, installed from the storage apparatus 908, or installed from the ROM 902. When the computer program is executed by the processing apparatus 901, the preceding functions defined in the methods of the embodiments of the present disclosure are implemented. According to the embodiments of the present disclosure, the processes described above with reference to the flowcharts may be implemented as computer software programs.

The electronic device provided in the embodiments of the present disclosure belongs to the same concept as the view angle switching method for a free view angle video provided in the preceding embodiments. For details not described in detail in the embodiments of the present disclosure, references are made to the preceding embodiments. The embodiments of the present disclosure have the same beneficial effects as the preceding embodiments.

An embodiment of the present disclosure provides a computer storage medium storing a computer program which, when executed by a processor, implements the view angle switching method for a free view angle video provided in the preceding embodiments.

It is to be noted that the preceding computer-readable medium in the present disclosure may be a computer-readable signal medium or a computer-readable storage medium, or any combination thereof. The computer-readable storage medium may be, for example, but is not limited to, an electrical, magnetic, optical, electromagnetic, infrared or semiconductor system, apparatus or device, or any combination thereof. More examples of the computer-readable storage medium may include, but are not limited to, an electrical connection with one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof. In the present disclosure, the computer-readable storage medium may be any tangible medium including or storing a program. The program may be used by or in conjunction with an instruction execution system, apparatus, or device. In the present disclosure, the computer-readable signal medium may include a data signal propagated in a baseband or as part of a carrier wave, where computer-readable program codes are carried in the data signal. The data signal propagated in this manner may be in various forms, including, but not limited to, an electromagnetic signal, an optical signal, or any appropriate combination thereof. The computer-readable signal medium may also be any computer-readable medium other than the computer-readable storage medium. The computer-readable signal medium may send, propagate or transmit a program used by or in conjunction with an instruction execution system, apparatus, or device. The program codes included on the computer-readable medium may be transmitted via any appropriate medium including, but not limited to, a wire, an optical cable, a radio frequency (RF), or any appropriate combination thereof.

In some embodiments, clients and servers may communicate using any network protocol currently known or developed in the future, such as a hypertext transfer protocol (HTTP), and may be interconnected via any form or medium of digital data communication (for example, a communication network). Examples of the communication network include a local area network (LAN), a wide area network (WAN), an internet (for example, the Internet), a peer-to-peer network (for example, an Ad-Hoc network) and any network currently known or to be developed in the future.

The preceding computer-readable medium may be included in the preceding computer device or may exist alone without being assembled into the computer device.

The preceding computer-readable medium carries one or more programs which, when executed by the electronic device, cause the electronic device to: determine view angle switching information according to a view angle switching operation triggered by a user; transmit the view angle switching information to a low-latency room corresponding to the client through a low-latency server so that when a view angle change message in the low-latency room is monitored, a media server determines a target video stream after a view angle is switched based on the view angle switching information and pushes the target video stream to the low-latency room; and obtain the target video stream in the low-latency room through the low-latency server and play the target video stream.

Alternatively, the electronic device is caused to, if a view angle change message in a low-latency room corresponding to a client is monitored, determine a target video stream after a view angle is switched based on view angle switching information in the low-latency room, where the view angle change message is generated when the client transmits the view angle switching information to the low-latency room through a low-latency server, and the view angle switching information is determined according to a view angle switching operation triggered by a user; and push the target video stream to the low-latency room so that the client obtains the target video stream in the low-latency room through the low-latency server and plays the target video stream.

Computer program codes for executing operations in the present disclosure may be written in one or more programming languages or a combination thereof. The preceding programming languages include, but are not limited to, an object-oriented programming language such as Java. Smalltalk, or C++ and may also include a conventional procedural programming language such as C or a similar programming language. The program codes may be executed entirely on a machine, partly on a machine, as a stand-alone software package, partly on a machine and partly on a remote machine, or entirely on a remote machine or a server. In the case where the remote computer is involved, the remote computer may be connected to the user computer via any type of network including a local area network (LAN) or a wide area network (WAN) or may be connected to an external computer (for example, via the Internet through an Internet service provider).

The flowcharts and block diagrams in the drawings show the possible architecture, functions and operations of the system, method and computer program product according to multiple embodiments of the present disclosure. In this regard, each block in the flowcharts or block diagrams may represent a module, a program segment or part of codes. The module, program segment or part of codes contains one or more executable instructions for implementing specified logical functions. It is also to be noted that in some alternative implementations, the functions marked in the blocks may be implemented in an order different from those marked in the drawings. For example, two successive blocks may, in fact, be executed substantially in parallel or in a reverse order, which depends on the functions involved. It is also to be noted that each block in the block diagrams and/or flowcharts and a combination of blocks in the block diagrams and/or flowcharts may be implemented by a special-purpose hardware-based system executing specified functions or operations or may be implemented by a combination of special-purpose hardware and computer instructions.

The units involved in the embodiments of the present disclosure may be implemented by software or hardware. The name of a unit is not intended to limit the unit in a certain circumstance. For example, an editable content display unit may also be described as an "editing unit".

The functions described herein may be executed, at least partially, by one or more hardware logic components. For example, without limitation, example types of hardware logic components that can be used include a field-programmable gate array (FPGA), an application-specific integrated circuit (ASIC), an application-specific standard part (ASSP), a system on a chip (SOC), a complex programmable logic device (CPLD), and the like.

In the context of the present disclosure, a machine-readable medium may be a tangible medium that may include or store a program used by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any appropriate combination thereof. More specific examples of the machine-readable storage medium may include an electrical connection with one or more wires, a portable computer disk, a hard disk, a random-access memory (RAM), a read-only memory (ROM), an erasable programmable read-only memory (EPROM or a flash memory), an optical fiber, a portable compact disc read-only memory (CD-ROM), an optical memory device, a magnetic memory device, or any appropriate combination thereof.

According to one or more embodiments of the present disclosure, [example one] provides a view angle switching method for a free view angle video. The method is applied to a client and includes the steps below.

View angle switching information is determined according to a view angle switching operation triggered by a user.

The view angle switching information is transmitted to a low-latency room corresponding to the client through a low-latency server, so that when a view angle change message in the low-latency room is monitored, a media server determines a target video stream after a view angle is switched based on the view angle switching information and pushes the target video stream to the low-latency room.

The target video stream in the low-latency room is obtained through the low-latency server and the target video stream is played.

According to one or more embodiments of the present disclosure, [example two] provides a view angle switching method for a free view angle video. The method is applied to a client and further includes the following:

For example, in a video live scenario, the view angle switching information includes target view angle information after the view angle is switched.

In a video on-demand scenario, the view angle switching information includes the target view angle information after the view angle is switched and a current play progress identifier when the user triggers the view angle switching operation.

According to one or more embodiments of the present disclosure, [example three] provides a view angle switching method for a free view angle video. The method is applied to a client and further includes the following:

For example, the current play progress identifier is a current play time stamp or a current play video frame sequence number.

According to one or more embodiments of the present disclosure, [example four] provides a view angle switching method for a free view angle video. The method is applied to a client.

For example, the step in which the target view angle information after the view angle is switched is determined according to the view angle switching operation includes the step below.

The target view angle information after the view angle is switched is determined according to a sliding operation of the user or a view angle clicking operation of the user.

According to one or more embodiments of the present disclosure, [example five] provides a view angle switching method for a free view angle video. The method is applied to a client.

For example, the step in which the target view angle information after the view angle is switched is determined according to the sliding operation of the user may include the steps below.

If the user slides a screen to the left, next view angle information of current view angle information in a counter-clockwise direction is used as the target view angle information after the view angle is switched.

If the user slides the screen to the right, next view angle information of current view angle information in a clockwise direction is used as the target view angle information after the view angle is switched.

According to one or more embodiments of the present disclosure, [example six] provides a view angle switching method for a free view angle video. The method is applied to a client and further includes the following:

For example, before the step in which the view angle switching information is determined according to the view angle switching operation triggered by the user,
  a video play request is transmitted to the media server so that the media server creates the low-latency room corresponding to the client through the low-latency server based on the video play request and transmits room information of the low-latency room to the client;
  the room information of the low-latency room is received, and the low-latency room corresponding to the room information is connected to the client through the low-latency server; and
  a video stream in the low-latency room is obtained through the low-latency server, and the obtained video stream is played. The obtained video stream is a video stream in a preset view angle pushed by the media server.

According to one or more embodiments of the present disclosure, [example seven] provides a view angle switching method for a free view angle video. The method is applied to a client.

For example, the low-latency server is a real-time communication (RTC) server, and the low-latency room is an RTC room.

According to one or more embodiments of the present disclosure, [example eight] provides a view angle switching method for a free view angle video. The method is applied to a media server and includes the steps below.

If a view angle change message in a low-latency room corresponding to a client is monitored, a target video stream after a view angle is switched is determined based on view angle switching information in the low-latency room, where the view angle change message is generated when the client transmits the view angle switching information to the low-latency room through a low-latency server, and the view angle switching information is determined according to a view angle switching operation triggered by a user.

The target video stream is pushed to the low-latency room so that the client obtains the target video stream in the low-latency room through the low-latency server and plays the target video stream.

According to one or more embodiments of the present disclosure, [example nine] provides a view angle switching method for a free view angle video. The method is applied to a media server.

For example, the steps in which the target video stream after the view angle is switched is determined based on the view angle switching information in the low-latency room, and the target video stream is pushed to the low-latency room includes the steps below.

A preset number of video frame sets currently and most newly cached are acquired. Each video frame set includes video frames in each view angle after alignment.

The target video frame set is determined from the preset number of video frame sets.

A target video frame after the view angle is switched is determined from the target video frame set according to target view angle information after the view angle is switched in the low-latency room. The target video frame is pushed to the low-latency room. The process returns to execute the operation of acquiring the preset number of video frame sets currently and most newly cached.

According to one or more embodiments of the present disclosure, [example ten] provides a view angle switching method for a free view angle video. The method is applied to a media server.

For example, before the step in which the preset number of video frame sets currently and most newly cached are acquired, the method further includes the steps below.

A current live video stream currently acquired by a camera in each view angle and alignment information corresponding to each video frame in the current live video stream are acquired.

Video frames having the same alignment information in the current live video stream of each view angle are combined into one video frame set, and the combined video frame set is cached.

According to one or more embodiments of the present disclosure, [example eleven] provides a view angle switching method for a free view angle video. The method is applied to a media server.

For example, the step in which the video frames having the same alignment information in the current live video stream of each view angle are combined into one video frame set includes the step below.

Video frames having the same acquisition time stamp in the current live video stream of each view angle are combined into one video frame set; or video frames having the same frame sequence number in the current live video stream of each view angle are combined into one video frame set.

According to one or more embodiments of the present disclosure, [example twelve] provides a view angle switching method for a free view angle video. The method is applied to a media server.

For example, the step in which the target video frame set is determined from the preset number of video frame sets includes the step below.

A video frame set having the earliest acquisition time or a video frame set having the smallest frame sequence number among the preset number of video frame sets is determined as the target video frame set.

According to one or more embodiments of the present disclosure, [example thirteen] provides a view angle switching method for a free view angle video. The method is applied to a media server.

For example, after the target video frame is pushed to the low-latency room, the method further includes the step below.

When multiple clients exist, after a video frame pushing traversal performed on the low-latency room corresponding to each client ends, the target video frame set in a cache is deleted.

According to one or more embodiments of the present disclosure, [example fourteen] provides a view angle switching method for a free view angle video. The method is applied to a media server.

For example, the step in which the target video stream after the view angle is switched is determined based on the view angle switching information in the low-latency room includes the step below.

The target video stream after the view angle is switched is determined according to a current live video stream corresponding to each view angle information after alignment and target view angle information after the view angle is switched in the low-latency room.

According to one or more embodiments of the present disclosure, [example fifteen] provides a view angle switching method for a free view angle video. The method is applied to a media server.

For example, the step in which the target video stream after the view angle is switched is determined based on the view angle switching information in the low-latency room includes the steps below.

A target on-demand video stream in a target view angle is determined according to an on-demand video stream corresponding to each view angle information after alignment and target view angle information after the view angle is switched in the low-latency room.

The target video stream after the view angle is switched is determined based on the target on-demand video stream and a current play progress identifier when the user triggers the view angle switching operation in the low-latency room.

According to one or more embodiments of the present disclosure, [example sixteen] provides a view angle switching method for a free view angle video. The method is applied to a media server and includes the steps below.

For example, before the view angle change message in the low-latency room corresponding to the client is monitored, the method further includes the steps below.

A video play request transmitted by the client is received.

The low-latency room corresponding to the client is created through the low-latency server based on the video play request, and the view angle change message of the low-latency room is monitored.

Room information of the low-latency room is transmitted to the client so that the client is connected to the low-latency room corresponding to the room information through the low-latency server.

The video stream in the preset view angle is pushed to the low-latency room so that the client obtains the video stream in the low-latency room through the low-latency server and plays the obtained video stream.

According to one or more embodiments of the present disclosure, [example seventeen] provides a view angle switching apparatus for a free view angle video. The apparatus is integrated in a client. The apparatus includes a view angle switching information determination module, a view angle switching information transmission module, and a target video stream play module.

The view angle switching information determination module is configured to determine view angle switching information according to a view angle switching operation triggered by a user.

The view angle switching information transmission module is configured to transmit the view angle switching information to a low-latency room corresponding to the client through a low-latency server, so that when a view angle change message in the low-latency room is monitored, a media server determines a target video stream after a view angle is switched based on the view angle switching information and pushes the target video stream to the low-latency room.

The target video stream play module is configured to obtain the target video stream in the low-latency room through the low-latency server and play the target video stream.

According to one or more embodiments of the present disclosure, [example eighteen] provides a view angle switching apparatus for a free view angle video. The apparatus is integrated in a media server. The apparatus includes a target video stream determination module and a target video stream pushing module.

The target video stream determination module is configured to, if a view angle change message in a low-latency room corresponding to a client is monitored, determine a target video stream after a view angle is switched based on view angle switching information in the low-latency room, where the view angle change message is generated when the client transmits the view angle switching information to the low-latency room through a low-latency server, and the view angle switching information is determined according to a view angle switching operation triggered by a user.

The target video stream pushing module is configured to push the target video stream to the low-latency room so that the client obtains the target video stream in the low-latency room through the low-latency server and plays the target video stream.

Additionally, although multiple operations are depicted in a particular order, this should not be construed as that these operations are required to be performed in the particular order shown or in a sequential order. In certain circumstances, multitasking and parallel processing may be advantageous. Similarly, although several specific implementation details are included in the preceding discussion, these should not be construed as limitations on the scope of the present disclosure. Certain features described in the context of separate embodiments may also be implemented in combination in a single embodiment. Conversely, various features described in the context of a single embodiment may also be implemented in multiple embodiments individually or in any suitable sub-combination.

What is claimed is:

1. A view angle switching method for a free view angle video, being applied to a client and comprising:
    determining view angle switching information according to a view angle switching operation triggered by a user;
    transmitting the view angle switching information to a low-latency room corresponding to the client through a low-latency server, so that in response to determining that a view angle change message in the low-latency room is monitored, a media server acquires a preset number of video frame sets currently and most newly cached, determines a target video frame set from the preset number of video frame sets, determines a target video stream from the target video frame set after a view angle is switched based on the view angle switching information, pushes the target video stream to the low-latency room, and returns to executing an operation of acquiring the preset number of video frame sets currently and most newly cached to push a next target video stream, wherein each video frame set of the preset number of video frame sets comprises video frames in each view angle after alignment; and
    obtaining the target video stream pushed to the low-latency room through the low-latency server and playing the target video stream;
    wherein the low-latency server is a real-time communication (RTC) server, and the low-latency room is an RTC room.

2. The method of claim 1, wherein
    in a video live scenario, the view angle switching information comprises target view angle information after the view angle is switched; and
    in a video on-demand scenario, the view angle switching information comprises the target view angle information after the view angle is switched and a current play progress identifier when the user triggers the view angle switching operation.

3. The method of claim 2, wherein the current play progress identifier is a current play time stamp or a current play video frame sequence number.

4. The method of claim 2, wherein determining the target view angle information after the view angle is switched according to the view angle switching operation triggered by the user comprises:
    determining the target view angle information after the view angle is switched according to a sliding operation of the user or a view angle clicking operation of the user.

5. The method of claim 4, wherein determining the target view angle information after the view angle is switched according to the sliding operation of the user comprises:
    in response to determining that the user slides a screen to left, using next view angle information of current view angle information in a counterclockwise direction as the target view angle information after the view angle is switched; and
    in response to determining that the user slides the screen to right, using next view angle information of current view angle information in a clockwise direction as the target view angle information after the view angle is switched.

6. The method of claim 1, before determining the view angle switching information according to the view angle switching operation triggered by the user, further comprising:
    transmitting a video play request to the media server so that the media server creates the low-latency room corresponding to the client through the low-latency server based on the video play request and transmits room information of the low-latency room to the client;

receiving the room information of the low-latency room, and connecting to the low-latency room corresponding to the room information through the low-latency server; and obtaining a video stream in the low-latency room through the low-latency server, and playing the obtained video stream, wherein the obtained video stream is a video stream which is in a preset view angle and pushed by the media server.

7. A view angle switching method for a free view angle video, being applied to a media server and comprising:

in response to determining that a view angle change message in a low-latency room corresponding to a client is monitored, determining a target video stream after a view angle is switched based on view angle switching information in the low-latency room, wherein the view angle change message is generated when the client transmits the view angle switching information to the low-latency room through a low-latency server, and the view angle switching information is determined according to a view angle switching operation triggered by a user; and pushing the target video stream to the low-latency room so that the client obtains the target video stream in the low-latency room through the low-latency server and plays the target video stream;

wherein the low-latency server is a real-time communication (RTC) server, and the low-latency room is an RTC room;

wherein determining the target video stream after the view angle is switched based on the view angle switching information in the low-latency room comprises:

acquiring a preset number of video frame sets currently and most newly cached, wherein each video frame set of the preset number of video frame sets comprises video frames in each view angle after alignment;

determining a target video frame set from the preset number of video frame sets; and determining, from the target video frame set, a target video frame after the view angle is switched according to target view angle information after the view angle is switched in the low-latency room; and wherein pushing the target video stream to the low-latency room comprises:

pushing the target video frame to the low-latency room, and returning to executing an operation of acquiring the preset number of video frame sets currently and most newly cached to push a next target video stream.

8. The method of claim 7, before acquiring the preset number of video frame sets currently and most newly, further comprising:

acquiring a current live video stream currently acquired by a camera in each view angle and alignment information corresponding to each video frame in the current live video stream; and combining video frames having same alignment information in the current live video stream of each view angle into one video frame set, and caching the combined video frame set.

9. The method of claim 8, wherein combining the video frames having the same alignment information in the current live video stream of each view angle into the one video frame set comprises:

combining video frames having a same acquisition time stamp in the current live video stream of each view angle into one video frame set; or combining video frames having a same frame sequence number in the current live video stream of each view angle into one video frame set.

10. The method of claim 7, wherein determining the target video frame set from the preset number of video frame sets comprises:

determining, among the preset number of video frame sets, a video frame set having an earliest acquisition time or a video frame set having a smallest frame sequence number as the target video frame set.

11. The method of claim 7, after pushing the target video frame to the low-latency room, further comprising:

in response to determining that a plurality of clients exist, deleting the target video frame set in a cache after a video frame pushing traversal performed on a low-latency room corresponding to each of the plurality of clients ends.

12. The method of claim 7, wherein determining the target video stream after the view angle is switched based on the view angle switching information in the low-latency room comprises:

determining the target video stream after the view angle is switched according to a current live video stream corresponding to each view angle information after alignment and target view angle information after the view angle is switched in the low-latency room.

13. The method of claim 7, wherein determining the target video stream after the view angle is switched based on the view angle switching information in the low-latency room comprises:

determining a target on-demand video stream in a target view angle according to an on-demand video stream corresponding to each view angle information after alignment and target view angle information after the view angle is switched in the low-latency room; and determining the target video stream after the view angle is switched based on the target on-demand video stream and a current play progress identifier when the user triggers the view angle switching operation in the low-latency room.

14. A view angle switching system for a free view angle video, comprising: a client, a media server, and a low-latency server, wherein the client is configured to implement the following:

determining view angle switching information according to a view angle switching operation triggered by a user;

transmitting the view angle switching information to a low-latency room corresponding to the client through a low-latency server, so that in response to determining that a view angle change message in the low-latency room is monitored, a media server acquires a preset number of video frame sets currently and most newly cached, determines a target video frame set from the preset number of video frame sets, determines a target video stream from the target video frame set after a view angle is switched based on the view angle switching information, pushes the target video stream to the low-latency room, and returns to executing an operation of acquiring the preset number of video frame sets currently and most newly cached to push a next target video stream, wherein each video frame set of the preset number of video frame sets comprises video frames in each view angle after alignment; and obtaining the target video stream pushed to the low-latency room through the low-latency server and playing the target video stream, wherein the low-latency server is a real-time communication (RTC) server, and the low-latency room is an RTC room; and the media server is configured to implement the view angle switching method for a free view angle video according to claim 7.

15. An electronic device, comprising:
at least one processor; and
a memory configured to store at least one program,
wherein when the at least one program is executed by the at least one processor, the at least one processor is caused to implement the following:
determining view angle switching information according to a view angle switching operation triggered by a user;
transmitting the view angle switching information to a low-latency room corresponding to the client through a low-latency server, so that in response to determining that a view angle change message in the low-latency room is monitored, a media server acquires a preset number of video frame sets currently and most newly cached, determines a target video frame set from the preset number of video frame sets, determines a target video stream from the target video frame set after a view angle is switched based on the view angle switching information, pushes the target video stream to the low-latency room, and returns to executing an operation of acquiring the preset number of video frame sets currently and most newly cached to push a next target video stream, wherein each video frame set of the preset number of video frame sets comprises video frames in each view angle after alignment; and
obtaining the target video stream pushed to the low-latency room through the low-latency server and playing the target video stream;
wherein the low-latency server is a real-time communication (RTC) server, and the low-latency room is an RTC room.

16. The electronic device of claim 15, wherein
in a video live scenario, the view angle switching information comprises target view angle information after the view angle is switched; and
in a video on-demand scenario, the view angle switching information comprises the target view angle information after the view angle is switched and a current play progress identifier when the user triggers the view angle switching operation.

17. The electronic device of claim 16, wherein the current play progress identifier is a current play time stamp or a current play video frame sequence number.

18. The electronic device of claim 16, wherein the at least one processor is caused to implement determining the target view angle information after the view angle is switched according to the view angle switching operation triggered by the user by:

determining the target view angle information after the view angle is switched according to a sliding operation of the user or a view angle clicking operation of the user.

19. A non-transitory computer readable storage medium storing a computer program, wherein the computer program is configured to, when executed by a processor, implements the view angle switching method for a free view angle video according to claim 1.

20. A view angle switching system for a free view angle video, comprising: a client, a media server, and a low-latency server,
wherein the client is configured to implement the view angle switching method for a free view angle video according to claim 1; and
the media server is configured to implement the following:
in response to determining that a view angle change message in a low-latency room corresponding to a client is monitored, determining a target video stream after a view angle is switched based on view angle switching information in the low-latency room, wherein the view angle change message is generated when the client transmits the view angle switching information to the low-latency room through a low-latency server, and the view angle switching information is determined according to a view angle switching operation triggered by a user; and
pushing the target video stream to the low-latency room so that the client obtains the target video stream in the low-latency room through the low-latency server and plays the target video stream;
wherein the media server is configured to implement determining the target video stream after the view angle is switched based on the view angle switching information in the low-latency room by:
acquiring a preset number of video frame sets currently and most newly cached, wherein each video frame set of the preset number of video frame sets comprises video frames in each view angle after alignment;
determining a target video frame set from the preset number of video frame sets; and
determining, from the target video frame set, a target video frame after the view angle is switched according to target view angle information after the view angle is switched in the low-latency room; and
wherein the media server is configured to implement pushing the target video stream to the low-latency room by:
pushing the target video frame to the low-latency room, and returning to executing an operation of acquiring the preset number of video frame sets currently and most newly cached to push a next target video stream.

* * * * *